United States Patent [19]

Chao

[11] Patent Number: 4,636,546
[45] Date of Patent: Jan. 13, 1987

[54] PROCESS FOR PREPARING MODIFIED POLYMER EMULSION ADHESIVES

[75] Inventor: Yen-Yau H. Chao, Harleysville, Pa.

[73] Assignee: Rohm and Haas Company, Philadelphia, Pa.

[21] Appl. No.: 781,583

[22] Filed: Sep. 30, 1985

Related U.S. Application Data

[63] Continuation-in-part of Ser. No. 594,515, Mar. 29, 1984, abandoned.

[51] Int. Cl.$^4$ .................... C08L 33/10; C08L 33/08; C08L 33/02
[52] U.S. Cl. ..................................... 524/507; 525/123
[58] Field of Search .......................... 524/507; 525/123

[56] References Cited

U.S. PATENT DOCUMENTS

| | | | |
|---|---|---|---|
| 3,401,135 | 9/1968 | Sato | 524/507 |
| 3,931,088 | 1/1976 | Sakurada | 524/507 |
| 4,298,511 | 11/1981 | Schimmel | 524/507 |

*Primary Examiner*—C. Warren Ivy
*Attorney, Agent, or Firm*—Carl W. Battle

[57] ABSTRACT

This invention is directed to an improved process for preparing coating or adhesive compositions useful in bonding expanded vinyl which is vacuum laminated to molded fiberboard substrates, comprising (1) mixing an aqueous dispersion of an addition polymer containing active hydrogen, wherein the addition polymer contains essentially no polyurethane functional moieties, with water emulsifiable difunctional and/or multi-functional isocyanate, and (2) subsequently adding to the mixture an aqueous dispersion of a polyurethane polymer. Adhesive compositions prepared using the process exhibit both superior shear strength and superior hot peel strength at elevated temperatures.

10 Claims, No Drawings

PROCESS FOR PREPARING MODIFIED POLYMER EMULSION ADHESIVES

CROSS REFERENCE TO OTHER APPLICATIONS

This is a continuation-in-part application of Ser. No. 594,515, filed Mar. 29, 1984, now abandoned.

BACKGROUND OF THE INVENTION

1. Field of the Invention

This invention is directed to an improved process for preparing coating or adhesive compositions useful in bonding expanded vinyl which is vacuum laminated to molded fiberboard substrates, comprising (1) mixing an aqueous dispersion of an addition polymer containing active hydrogen, wherein the addition polymer contains essentially no polyurethane functional moieties, with water emulsifiable difunctional and/or multi-functional isocyanate and (2) subsequently adding to the mixture an aqueous dispersion of a polyurethane polymer. Adhesive compositions prepared using the process exhibit both superior shear strength and superior hot peel strength at elevated temperatures.

2. Brief Description of the Prior Art

Manufacturers in the transportation industry, especially the automobile industry, build a substantial portion of the interior of their vehicles using parts made from molded fiberboard covered with polyvinyl chloride sheet or film (vinyl). The vinyl film is usually held in place on the fiberboard part with an adhesive. One technique which is commonly employed for covering fiberboard parts with vinyl is vacuum lamination. In the vacuum lamination technique, the vinyl is stretched up to several hundred percent of its original length, being drawn in many cases over very deeply convoluted portions of the fiberboard substrate. Prior to the lamination, the substrate is coated with an adhesive to bond the vinyl to the fiberboard. Because the vinyl is severely stretched during the vacuum lamination process, substantial retractive forces are built into the laminate. The adhesive used to bond the vinyl to the fiberboard must be able to withstand the substantial retractive forces, not only during the manufacturing process, but also after the completed laminated part has been installed in a vehicle. In service, the laminated part may encounter severe environmental conditions repeatedly. For example, an automobile containing laminated parts may well be expected by its owner to withstand sitting in the desert sun with its windows rolled up during mid-summer on a daily basis. The adhesive used to bond the vinyl to the fiberboard must consequently exhibit good resistance to debonding at high temperatures.

Another potential problem which may be encountered in preparing vacuum laminated vinyl/fiberboard parts bonded together with an adhesive is that of plasticizer migration. Polyvinyl chloride films frequently contain substantial proportions of low molecular weight molecules used to plasticize the films. The plasticizer is included in the film in order to make the film flexible. Low molecular weight vinyl plasticizers, for example, the dialkyl phthalate plasticizers, while effective in flexibilizing the otherwise rigid polyvinyl chloride film, suffer from the fact that they are both relatively volatile and tend to migrate from the polyvinyl chloride into materials in which the vinyl is in contact. Over time, plasticizer migrating from the polyvinyl chloride film into the adhesive composition which bonds the vinyl film to a fiberboard substrate may change both the chemical and physical properties of that adhesive composition. The effect may be to weaken the adhesive bond. Plasticizer migration is accelerated at high temperatures, such as encountered in the hypothetical automobile in the desert.

There are two major types of adhesive which are used to bond vinyl to fiberboard in the vacuum lamination process. These same adhesives may be used to bond vinyl to a variety of other substrates, such as wood, metals, other plastics, and other wood fiber products. These adhesives are two-part epoxies and solvent-based two-part urethanes. Although these products give satisfactory performance, there are several problems associated with their use. Among these problems are that of toxicity of the adhesive composition, short pot life (usually on the order of one day), and solvent emission from the adhesives themselves. Although one-part water-based adhesive compositions have long been known for a variety of applications, up until this time water-based adhesives have not been able to provide an adequate combination of heat resistance, plasticizer migration resistance, and humidity resistance necessary for adhesives which are to be used in bonding vinyl to fiberboard substrates in the vacuum lamination process.

Adhesive compositions based on aqueous dispersions of addition polymers prepared by the emulsion polymerization of mono-alpha, beta-ethylenically unsaturated monomers are well known to the art. Homo- and copolymers of acrylic and vinyl acetate monomers are widely used in preparing adhesive compositions. It is known that these polymer latexes may be modified using isocyanate functional monomer or polymers in order to prepare high performance adhesive and coating materials which do not yield formaldehyde upon curing, an undesirable by-product of a widely-used alternative crosslinking chemistry. For example, German Pat. No. 2,643,642, assigned to Koyo Sangyo K.K., discloses an acrylic polymer emulsion containing between 0.1 and 100 weight percent with respect to emulsion polymer solids of isocyanate compound or isocyanate polymer and which is useful as a heat and water resistant pressure sensitive adhesive composition. Another example of isocyanate modification of a polymer emulsion is presented by Japanese unexamined patent application publication No. 79/154,053. This patent discloses a vinyl leather cloth obtained by coating a base cloth (which has been pretreated by an agent composed of an aqueous emulsion and/or the aqueous solution of a water soluble high molecular weight substance and an isocyanate compound or an isocyanate polymer having more than two isocyanate groups per molecule) with a vinyl chloride resin containing plasticizers, stabilizers, pigments, etc. The vinyl leather cloth obtained has excellent softness, water resistance and durability. The preferable isocyanate component is used at 0.1 to 200% by weight on the total solids content of the aqueous emulsion and/or the high molecular weight water-soluble substance. The polymer emulsion may contain polyvinyl chloride vinyl chloride-ethylene copolymer, polyacrylamide, polyacrylate, etc. The water-soluble high molecular weight substance preferably has hydrogen atoms which are reactive with isocyanate; for example, carboxymethyl cellulose, methyl cellulose, polyvinyl alcohol, polyvinyl pyrrolidine, modified polyvinyl alcohol, etc. Another example of isocyanate modified polymer latex is presented by Japanese Kokai No.

75/69137 (Chemical Abstract 83-148465q) which discloses water-resistant adhesive composition for polywoods prepared from an aqueous emulsion mixed with polyvinyl alcohol and an isocyanate compound dissolved in hydrophobic solvent. For example, a butadiene methylmethacrylate copolymer latex can be mixed with polyvinyl alcohol and treated with a mixture of a polyisocyanate, diheptyl phthalate and calcium carbonate filler to give an adhesive which yields plywood with good water resistance and adhesion strength.

Isocyanate functional monomers and isocyanate functional polymers are well known for their reaction with active hydrogen (for example —COOH, —OH, —SH, and NH) in various polymeric and monomeric materials to achieve chain extension, crosslinking and other useful chemical modifications of the primary molecule.

For adhesive applications isocyanate prepolymers have been found to be advantageous in modifying polymer latices. For example Japanese unexamined patent application publication No. 79/102,334 discloses an adhesive composition comprising a water-soluble polymer or aqueous polymer dispersion and a hydrophilic compound containing more than two isocyanate groups per molecule. The adhesive composition shows good water resistance and adhesive strength and can be used for the bonding of plastics. The water-soluble polymer may be carboxy methyl cellulose, hydroxy methyl cellulose, methyl cellulose, polyvinyl pyrrolidone, etc., the aqueous polymer dispersion may be ethylene-vinyl acetate copolymer, polyvinyl acetate, polyacrylic acid, vinyl acetate-acrylic acid copolymer, etc. The hydrophilic compound may be the reaction compound of alkylene oxide polymer.

Another example of this type system is disclosed in Japanese patent application No. 69/11279 (Chemical Abstract 72-13368n) which discloses adhesive compositions having high adhesive strength, aging resistance and chemical resistance, and which is prepared by mixing aqueous emulsions of polymers having carboxyl groups with isocyanate copolymers. For example, an isocyanate block copolymer prepared from a mixture of trimethylolpropane toluene diisocyanate and MeEtC=NOH can be emulsified and added to a latex polymer prepared from methacrylic acid, methyl methacrylate, ethylene glycol monomethacrylate and butadiene, to give an adhesive composition useful in coating fabric.

Another example is disclosed by Japanese examined Pat. No. 76/036,264 in which a vinyl acetate and/or (meth)acrylate ester (co)polymer or its mixture with polyvinyl alcohol is emulsified and an isocyanate prepolymer is added to the macromolecular emulsion to produce a coating composition. The prepolymer is prepared from polyoxypropylene glycol or polyoxypropylene triol and toluene diisocyanate.

U.S. Pat. No. 4,396,738 discloses aqueous adhesive and coating compositions composed of an aqueous emulsion or dispersion of a polymer or interpolymer of one or more vinyl monomers (such as an emulsion of a copolymer of vinyl acetate and butyl acrylate) and a aqueous emulsion or dispersion of polyisocyanate which has at least partially reacted with an alcohol, and wherein the dispersion or emulsion of the polyisocyanate is stabilized with a combined surfactant and alcohol.

Enhanced performance of isocyanate modified polymer latex is generally considered to be derived from chemical crosslinking.

Aqueous dispersions of polyurethane resins are well known in the art. For example, a preparation of polyurethane dispersions is disclosed in U.S. Pat. No. 4,186,118, which is hereby incorporated by reference, and in German Offenlegenschriften Nos. 2014385, 1953345, 1953348, and 1953349. Polyurethane resin dispersions are known to be useful in combination with resin emulsions of other types of copolymer. For example, Japanese unexamined Pat No. 79/127,442 (Derwent Abstract No. 81792B/45) discloses adhesive compositions comprising an aqueous solution or dispersion of a polyester polyol-type polyurethane and a carboxy-modified rubber latex or copolymer emulsion which shows improved heat resistance and reduced tendency to lose adhesion to a substrate even on heating at high temperature over a long period of time. A polyurethane solution or dispersion is used in the amount of 5–100 parts by weight on the solids content relative to a 100 parts by weight of a carboxyl modified synthetic rubber latex or ethylene vinyl acetate copolymer emulsion. The polyurethane may be, for example, prepared from MDI and polyester polyol which in turn may be prepared from isophthalatic acid and tetramethylene glycol or adipic acid and 2,2-dimethylolpropionic acid. Another example is given by U.S. Pat. No. 4,108,811, which is hereby incorporated by reference. The U.S. Pat. No. 4,108,811 discloses a water-based latex composition comprising a binder formed by blending an aqueous disperion of an acrylic or vinyl acetate polymer and an aqueous alkaline emulsion of a polyurethane obtained by reacting diisocyanate with a hydroxylic oil-modified resin (which is either the alcoholysis product of a drying or semi-drying oil) and at least one polyol or the reaction product of at least one polyol or at least one mono- or polymeric drying or semi-drying fatty acid. This composition is useful for coating corrodable surfaces, for example, sand-blasted ferrous metals and is stable even in the presence of highly reactive pigments.

U.S. Pat. No. 4,186,118 discloses a process wherein a diisocyanate is used to modify an aqueous mixture of polyurethane dispersion and a non-polyurethane polymer latex. The modification is accomplished by coating the non-polyurethane polymer latex particles with a polyurea film formed from the diisocyanate. These modified dispersions are useful as water resistant surface coatings and as leather dressings which are abrasion resistant, even in the presence of moisture.

U.S. Pat. No. 4,347,338 discloses a process for preparing a thermosettable polyurethane product which comprises blending a compound having two or more terminal isocyanate groups (e.g. 4,4'-diphenylmethane diisocyanate) with a thermoplastic resin (e.g. acrylic resin) which is inert towards the isocyanate groups to prepare an isocyanate compound batch and further blending the isocyanate compound batch with a thermoplastic urethane resin, and subsequently fabricating the resultant mixture, as by melt extrusion. The thermosettable product may be formed into a variety of useful articles and cured by heat application.

U.S. Pat. No. 4,433,095 discloses improved aqueous adhesives comprising an aqueous polymer dispersion and a water-dispersible polyisocyanate having an average NCO-functionality of at least 2.2 and comprising an aromatic isocyanate and an emulsifier produced by reacting an aromatic isocyanate with hydrophilic compounds such as polyether alcohols.

U.S. Pat. No. 3,931,088 discloses an adhesive composition comprising (1) aqueous solution of polyvinyl alcohol, aqueous emulsion of vinyl acetate polymer and/or an aqueous latex of butadiene polymer; and (2) solution of an isocyanate compound or polymer. Further U.S. Pat. No. 3,401,135 discloses adhesive composition consisting of (1) latex containing copolymers of polymerizable olefinic compound, acrylic or methacrylic acid, and ethylene glycol monomethacrylate; and (2) a blocked polyisocyanate. Both the U.S. Pat. Nos. 3,931,088 and 3,401,135 only teach adhesive compositions comprising a polymeric latex and an isocyanate compound, and do not incorporate the beneficial polyurethanes in the formulations.

U.S. Pat. No. 4,298,511 describes a urethane rheology modifier derived from the reaction of polyakylene oxide; polyfunctional compounds, such as polyols, amines, and thiols; diisocyanate; and water. The reaction takes place in an inert organic solvent where all reactants are blended together or in any order. These modifiers can be used in water- or solvent-based coating compositions, such as acrylic latexes.

Aqueous polyurethane dispersions (PUD) of linear polyester urethanes are known to be useful as laminating adhesives, especially where flexibility, light resistance and adhesive strength at high temperatures are desired. PUDs can be used to bond textiles, non-wovens, leather, fiberboard and polyurethane films as well as plasticized polyvinyl chloride films. PUD can be blended with other polymer dispersions such as latices of acrylic monomers, ethylene-vinyl acetate, stryrene-butadiene rubbers, nitrile and natural rubbers, and the like. Blends may be chosen to enhance the flexibility of a PUD film or improve its toughness. PUD may be plasticized with conventional plasticizers such as the phthalate-ester plasticizers and may be crosslinked, as with urea and melamine/formaldehyde condensates.

In the present invention the applicant has surprisingly discovered that improvements in polyurethane-modified isocyanate/polymer coatings and adhesives can be obtained through a specific sequence of addition/reaction. Applicant's invention involves a two-step process wherein (1) latex polymer containing active hydrogen is mixed with multi-functional isocyanates to form a polymer-isocyanate adduct, and (2) the adduct is subsequently mixed with the polyurethane to form the final polymer-isocyanate-polyurethane composition. This two-step sequence results in adhesive and coating compositions having surprisingly improved adhesion properties.

SUMMARY OF THE INVENTION

One of the objects of this invention is to provide an improved process for preparing water-based adhesives which are useful in bonding expanded vinyl film to molded fiberboard substrates in the vacuum lamination process. Another object of this invention is to provide an improved process for preparing a water-based adhesive, impregnating agent composition and coating composition which has excellent pot-life. Yet another object of this invention is to provide an improved process for preparing water-based adhesives, impregnating agents and coating compositions which have pot lives greater than seven days at room temperature. Another object of this invention is to provide a process which provides water-based coatings and adhesives which exhibit excellent adhesion to a variety of rigid and non-rigid substrates, including metal, plastic, leather, wood, wood fiber products, paper and non-woven fibers. Still another object of this invention is to provide water-based coatings and adhesives which exhibit excellent water resistance and an improved process for preparing these compositions. Further objects of this invention are to provide a process for preparing coating and adhesive compositions which exhibit excellent resistance to plasticizer migration, chemical resistance, flexibility, abrasion resistance, exterior weatherability, and print and block resistance. These and other objects of this invention which will become apparent below, are met by this invention which is an improved process for preparing coating or adhesive compositions comprising (1) mixing an aqueous dispersion of an addition polymer containing active hydrogen, wherein said polymer contains essentially no polyurethane functional moieties, with at least one isocyanate selected from the difunctional and multi-functional isocyanates; and (2) subsequently adding to the mixture an aqueous dispersion of a polyurethane polymer.

DETAILED DESCRIPTION OF THE INVENTION

The process of this invention for preparing an improved coating and adhesive compositions comprises (1) mixing an aqueous dispersion of an addition polymer containing active hydrogen, wherein such polymer contains essentially no polyurethane functional moieties, with at least one isocyanate selected from the difunctional and multifunctional isocyanates; and (2) subsequently adding to the mixture an aqueous dispersion of a polyurethane polymer. The addition polymer containing active hydrogen is preferably an aqueous polymer prepared by emulsion polymerization. The sequence of mixing the components of the improved coating or adhesive composition is critical to this invention. The unexpectedly superior properties of the products of this process are realized only when this sequence is observed. The addition polymer containing the active hydrogen must be mixed with the difunctional isocyanate prior to adding to that mixture an aqueous dispersion of a polyurethane polymer. It is believed that the active hydrogen contained within the addition polymer reacts at least in part with the difunctional isocyanate to form a polymer-isocyanate adduct, and that subsequently the polyurethane polymer reacts, at least in part, with the polymer-isocyanate adduct. This invention is no way limited by the foregoing or any other plausible interpretation of the result obtained.

The aqueous latex addition polymer is prepared from a monomer mixture, the major proportion (defined as greater than 50% by weight) of which is composed of monomers preferably selected from the ($C_1$–$C_8$) alkyl esters of acrylic, methacrylic, ethacrylic and propacrylic acids; the ($C_1$–$C_8$) alkyl diesters of itaconic, citraconic, isocitraconic, fumaric, and maleic acids; styrene, vinyl toluene, dimethyl styrene, trimethyl styrene, ethyl styrene, methylethyl styrene, tert-butyl styrene, chloromethyl styrene, monochloro styrene, dichloro styrene, cyano styrene, vinyl acetate, vinyl propionate, vinyl butyrate, vinyl valerate, vinyl versetate, methyl vinyl ketone, ethyl vinyl ketone, acrylonitrile, methacrylonitrile, divinylbenzene, vinyl acrylate, butadiene, isoprene and chloroprene. If desired, other monomers, especially, alpha, beta-ethylenically unsaturated monomers may be used to prepare the aqueous latex polymer. The addition polymers useful in this invention preferably contain essentially little or no polyurethane functional moieties, such as polyurea, carbamate, or carbodiimide linkages.

The preparation of aqueous latex copolymers for use in preparing adhesives is well known in the art. The practice of emulsion polymerization is discussed in detail in D. C. Blackley, *Emulsion Polymerization* (Wiley, 1975). The preparation of aqueous latex addition copolymers by emulsion polymerization and their use in formulating coating and adhesives is discussed in H. Warson, *The Applications of Synthetic Resin Emulsions* (Ernest Benn Ltd., 1972).

Conventional emulsion polymerization techniques may be used to prepare the polymers employed in the compositions of this invention. Thus the monomers may be emulsified with an anionic, a cationic or nonionic dispersing agent, and about 0.05% to 10% thereof on the weight of total monomers can be used. Acidic monomers are water soluble and thus serve as dispersing agents which aid in emulsifying the other monomers used. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in conventional proportions, such as from $\frac{1}{2}$ to 2% each based on the weight of monomers to be copolymerized. The polymerization temperature may be from room temperature to 90° C. or more as is conventional.

Examples of emulsifiers which are suited to the polymerization process of emulsions used in the present invention include alkaline metal and ammonium salts of alkyl, aryl, alkaryl, and aralkyl sulfonates, sulfates, and polyether sulfates; the corresponding phosphates and phosphonates; and ethoxylated fatty acids, esters, alcohols, amines, amides; and alkylphenols.

Chain transfer agents, including mercaptans, polymercaptans, and polyhalogen compounds, are often desirable in the polymerization mixture to control polymer molecular weight.

It is especially preferred that the aqueous latex addition polymer be prepared from a monomer mixture, wherein greater than 50% by weight is composed of monomers selected from the ($C_1$-$C_8$) alkyl esters of acrylic, methacrylic, ethacrylic and propacrylic acids and the ($C_1$-$C_8$) alkyl diesters of itaconic acid, styrene and acrylonitrile. These monomers may exclusively constitute the non-functional monomer portion of the monomer mixture from which the aqeous latex polymer is prepared. Alternatively minor amounts of other monmers may be included, for example, adhesion promoters and the like.

The aqueous latex addition polymer must be prepared from a monomer mixture which contains an active hydrogen functional monomer. The term "active hydrogen" refers to hydrogens which, by virtue of the identity of the atoms to which they are bound, display reactivity according to the Zerewitinoff test. Preferred active hydrogens include hydrogen atoms attached to oxygen, nitrogen or sulfur, as in hydroxyl, carboxylic acid, primary and secondary amino, and thiol functional groups. The amount of active hydrogen in the polymers useful in this invention should be greater than 0.001% by weight of the polymer.

Acidic monomers which may be used in preparing the emulsions employed in the instant invention are alpha, beta-monoethylenically unsaturated acids such as maleic, fumaric, aconitic, crotonic, citraconic, acyloxypropionic, acrylic, methacrylic, or itaconic. Further examples of acidic monoethylenically unsaturated monomers that may be copolymerized to form the addition polymers of the instant invention are partial esters of unsaturated aliphatic dicarboxylic acids and particularly, the alkyl half esters of such acids. Examples of such partial esters are alkyl half esters of itaconic acid, fumaric acid, and maleic acid wherein the alkyl group contains 1 to 6 carbon atoms. Representative members of this group of compounds include methyl acid itaconate, butyl acid itaconate, ethyl acid fumarate, butyl acid fumarate, and methyl acid maleate.

The active hydrogen functional monomer is preferably selected from the class consisting of acrylic acid, methacrylic acid, itaconic acid, acryloxypropionic acid and vinyl alcohol. More preferably, the active hydrogen functional monomer is selected from among acrylic acid, methacrylic acid and itaconic acid. Most preferably the active hydrogen functional monomer is acrylic acid. The addition polymer may be prepared by the well known techniques of emulsion polymerization, solution polymerization, bulk polymerization or suspension polymerization. Preferably the addition polymer is prepared by emulsion polymerization. Addition polymer may be prepared by free radical polymerization or radiation induced polymerization techniques such a photopolymerization, ultra violet-initiated polymerization, and electron beam-initiated polymerization. The free radical polymerization may be thermal or free radical initiation. The preparation of many types of addition polymers suitable for this invention is disclosed, for example, in H. Warson, *The Applications of Synthetic Resin Emulsions* (Ernest Benn Ltd., 1972).

When the process of this invention is used to prepare a composition which is to be used as an adhesive, the monomer composition of the addition polymer must be selected so that its glass transition temperature ($T_g$) lies below the temperature at which it will be used to form an adhesive bond. For example, if the adhesive is to be used at room temperature (about 20° C.), then the monomer composition should be selected to provide an addition polymer with a calculated glass transition temperature of less than about 10° C. This selection is made to ensure that the adhesive is relatively soft and tacky at the application temperature. On the other hand, if the adhesive is to be applied at elevated temperature, for example, 75° C., then the glass transition temperature should lie below about 65° C., but may be about room temperature. The glass transition temperature of the compositions of this invention is preferably less than about $-10°$ C., and more preferably less than about $-40°$ C.

On the other hand, when the process of this invention is used to prepare compositions which are to be used as coatings or in the formulation of a coating composition (for example, as a polymeric binder for a coating composition), then the monomer composition of the addition polymer is preferably selected so that its glass transition temperature will lie above the temperature at which the coated substrate is to be used (service temperature). For example, if the coated substrate forms part of an article which is to be used at ambient room temperature (i.e. about 18° C.), then the $T_g$ of the addition polymer is preferably greater than 18° C., for example, 40° C. This is desirable because the coating derived from the coating composition should be relatively hard at its service temperature.

The polyisocyanates useful in the present invention are those organic isocyanates having at least two isocyanate functional groups per molecule such as toluene diisocyanate, 4,4'-diphenylmethane diisocyanate (MDI), ethylene diisocyanate, trimethylene diisocyanate, hexamethylene diisocyanate, tetraethylene diisocyanate, pentamethylene diisocyanate, 1,4-diisocyanato cyclohexane, cyclopentene 1,3-diisocyanate, 1-methyl phenylene-2,4-diisocyanate, diphenyl-4,4'diisocyanate, benzene-1,2,4-triisocyanate, xylene-1,4-diisocyanate, 4,4'-diphenylpropane diisocyanate, 1,2,3,4-tetraisocyanato butane, polymethylene polyphenyl isocyanate, and water-emulsifiable aqueous dispersions of polyisocyanates such as those described in U.S. Pat. Nos. 4,186,118 and 4,396,738. Isocyanate prepolymers may also be used in preparing the compositions of this invention. Particularly useful and preferred are polyisocyanates which can be emulsified or dispersed in water. 4,4'-diphenylmethane diisocyanate and hydrogenated 4,4'-diphenyl methane diisocyanate and their mixtures with organic solvents are also suitable for use in the process of this invention. The polyisocyanates useful in this invention may be aliphatic or aromatic, but must contain at least two isocyanate groups per molecule. Water dispersible or emulsifiable polyisocyanates, aqueous dispersions of polyreacted polyisocyanates, and organic solvent-containing polyisocyanates are particularly suitable for the processes of this invention. Polyisocyanates which are in the liquid state at room temperature are preferred. Useful levels of isocyanates for the compositions of this invention range from about 0.05% to about 10% by weight based on total dry weight of the composition.

The aqueous polyurethane dispersions of this invention may be anionic, cationic or nonionic. They may be of the self-crosslinking type or of the type which require external crosslinking agent. However, the aqueous polyurethane dispersions may be used without the addition of an external crosslinker or the presence of internal crosslinking functionality. For example, those disclosed in U.S. Pat. No. 3,437,624 (which is hereby incorporated by reference) and in 9 *Progress in Organic Coatings* 281 (1981), may be employed. The aqueous polyurethane dispersions may be polyether urethanes in aqueous dispersion. The aqueous polyurethane dispersions may be linear polyester urethanes in aqueous dispersion, such as those manufactured and sold by Mobay Chemical Corp. under the designations of DESMOCOLL ® E-471 and E-723 and which have the following physical properties:

| Form | Liquid |
|---|---|
| Polymer Content | Approximately 40-50% |
| Density of polymer @ 20° C. | Approximately 1.2 gram/cm$^3$ |
| Density of dispersion @ 20° C. | Approximately 1.08-1.1 gram/cm$^3$ |
| Average Particle Size | Approximately 0.1-0.2 microns |
| pH | Approximately 7.0 |
| Surface tension | Approximately 60 dynes/cm |
| Particle charge | Anionic. |

The degree of crystallity of the polyurethane may vary from very low to high. The polyurethane dispersion may have ionic side chains on the polyurethane polymer or the dispersion may be free of ionic groups covalently bonded to the polyurethane polymer. The dispersion may be stabilized by any of the conventional techniques known to the art. For example, the dispersion may be stabilized by nonionic and/or anionic surfactant adsorbed to the dispersed particles. The polyurethane dispersion may contain polyurethane polymer molecules which bear active hydrogen. The level of polyurethane polymer useful for the compositions of this invention range from about 0.1% to about 50% of the composition on a dry weight basis.

The vinyl substrates which can be bonded using the adhesive products of the process of this invention include flexible polyvinyl chloride films and laminates, including bi- and tri-laminates produced from sheets of cellular polyvinyl chloride and non-cellular flexible polyvinyl chloride sheeting. The production of cellular polyvinyl chloride by both dispersed gas blowing ("expanded vinyl") and by other methods is discussed in W. S. Penn, *PVC Technology* (John Wiley & Sons, 3rd Ed. 1971) 478–497. The formulation of PVC foams is discussed in A. C. Werner, "Polyvinyl Chloride Foams" in *Plastic Foams, Part* 1 (Marcel Dekker, Inc., N.Y., NY 1972) 306–323. Examples of expanded vinyl laminates which may be used with the products of the process of this invention are those manufactured by Uniroyal, Inc. and sold under the grade designations GDB7705 (bilaminate, 90 mil thick), 6AB7505 (trilaminate, 90 mil), CF485130 (trilaminate, 60 mil), BN480437 (trilaminate 90 mil), and BN480229 (trilaminate, 90 mil). These and other PVC laminates which are conventionally used in the fabrication of parts for automobile interiors may be used.

This invention is illustrated by the following examples which are intended to aid in understanding the invention and in no way limit the invention.

EXAMPLE 1

Eight parts by weight of a water dispersible MDI having isocyanate content of 26% (Desmodur ® KA-8267, a solvent-free aromatic polyisocyanate having a density of approximately 1.23 g/cm$^2$ at 23° C., available from Mobay Chemical Corp.) is added, under gentle stirring (800 rpm), into 1000 parts of a latex of butyl acrylate (BA), ethyl acrylate (EA) and acrylic acid (AA) copolymer (with a weight ratio of monomers of 75 BA/21.7 EA/3.3 AA) having a 55.6 percent total solids content. This mixture is designated as Part A.

Into the above mixture, 50 parts by weight of a polyurethane dispersion (designated as Part B) with average particle size of 0.2 micron and 40 percent total solids (Desmocoll ® E-471, Mobay Chemical Corp.) is blended with gentle stirring (500 rpm). The emulsion mixture is applied on a 1 mil thick Mylar registration mark film (DuPont) with a 1.5 mil bird-type film applicator (Gardner Corp.). The wet film is dried at 180° F. for 15 minutes. The dried film is cut into one-inch wide strips and laid onto methyl ethyl ketone-cleaned stainless steel panels (Q-panel Company). A 5 lb. rubber roller is passed over the film-stainless steel laminate in a back-and-forth movement once. A one-half inch by one inch area of the laminate is tested for shear strength and dead load using a one kilogram load. The test chamber is maintained at 50% relative humidity and 77° F. throughout the test. The time taken for the weight and the adhesive film to fall is recorded. Films coated with a latex mixture containing both part A and part B did not fail after 1200 hours. Films coated with either part A alone, or a mixture of parts A and B without polyisocyanate addition fail in under 15 hours.

EXAMPLE II

One thousand parts of an aqueous emulsion of ethyl acrylate and acrylic acid copolymer (with weight ratio of 96.7 EA/3.33 AA and 53.3% total solids) is mixed with MDI (Desmodur ® KA-8267). The MDI-modified acrylate emulsion is later mixed with 100 parts by weight of an anion-compatible polyurethane dispersion having a pH of 4–5 and 40% solids. The latex mixture is then applied by either brush or spraying to a piece of ⅛ inch thick fiberboard at a rate of 8–12 gms. per sq. ft. (dry). After drying, a 60 mil or 90 mil thick heated (250° F.–300° F.) vinyl film is laminated onto the fiberboard under vacuum (24 psi). Laminated samples are cut into 1-inch wide strips and tested for shear strength at 180° F.; the dead load weight used is 500 gms per square inch. Samples coated with the latex mixture fail after more than 4 hours. Samples coated with either the acrylate emulsion alone or the mixture of the polyurethane and acrylate emulsions without polyisocyanate fail in less than 15 minutes.

EXAMPLE III

Vinyl/fiberboard laminates are prepared by the following process: An adhesive mixture is brushed coated onto fiberboard. Vinyl is heated to 250°–300° F. and vacuum laminated onto the adhesive-coated fiberboard. The laminate is tested by hanging 500 gm per square inch dead loads onto vinyl strips in a oven at 180° F. Acrylate emulsion having a composition of 96.7 EA/3.3 AA and 53% total solids is employed. The acrylate emulsion is mixed with a water-dispersible polyisocyanate, MDI (Mobay Chemical KA-8267). Subsequently a polyurethane dispersion (Mobay Chemical E-471, 40% total solids) is post-added to the isocyanate-modified acrylate emulsion to form the adhesive mixture of this invention. Table 1 shows the result of bonding the vacuum laminated vinyl to the adhesive coated fiberboard when the sequence used in mixing the components of the adhesives is varied. When the acrylic emulsion and the polyurethane dispersion are first mixed together and subsequently modified by the post-addition of the polyisocyanate as in Example 3A, the vinyl fiberboard laminate bond fails in less than 3/10 of an hour at 180° F. When the polyurethane dispersion and the polyisocyanate are initially mixed together and subsequently the mixture is modified by the addition of the acrylic emulsion, the vinyl fiberboard laminate adhesive bond again fails in less than 3/10 of an hour at 180° F. (Example 3C). However, when the acrylate emulsion is mixed with the polyisocyanate and subsequently the polyurethane dispersion is added to that mixture according to this invention, the vinyl fiberboard laminate bond fails only after more than 3 hours at 180° F. This experiment illustrates the importance of the sequence of mixing of the components in the process of this invention.

TABLE 1

Effect of Sequence of Mixing of Components

| Example | Initial Mixture | Post Additive | Dead Load Duration of Vinyl/Fiberboard Laminate (Hours at 180° F.) |
|---|---|---|---|
| 3A | 100 parts acrylate emulsion[a] and 10 parts PUD[b] | 0.8 part polyisocyanate | 0.3 |
| 3B | 100 parts acrylic emulsion and polyisocyanate[c] | 10 parts PUD | 3.0 |
| 3C | 10 parts PUD and 0.8 part | 100 parts acrylate | 0.3 |
| | polyisocyanate | emulsion | |

[a] Acrylic emulsion has 53% total solids with 96.7 EA/3.3 AA
[b] PUD is Mobay Chemical's Desmocoll ® E-471 with 40% total solids
[c] Polyisocyanate is Mobay Chemical's Desmodur ® KA-8267
[d] Dead load of 500 grams per square inch is used

I claim:

1. A process for preparing an improved coating or adhesive composition comprising (1) first mixing an aqueous dispersion of addition polymer polymerized from ethylenically unsaturated monomers, wherein the addition polymer contains greater than 0.001% active hydrogen and substantially no polyurethane functional moieties, with about 0.05% to about 10% of at least one isocyanate selected from the difunctional and multifunctional isocyanates to form a polymer-isocyanate adduct mixture; and (2) subsequently adding to said polymer-isocyanate adduct mixture from about 0.1% to about 50% of an aqueous dispersion of polyurethane polymer, all percentages being on a total dry weight basis, and wherein the active hydrogen content of the addition polymer is derived from an active hydrogen functional monomer selected from the group consisting of acrylic acid, methacrylic acid, itaconic acid and acryloxypropionic acid.

2. The process of claim 1 wherein the addition polymer is an aqueous latex polymer prepared by emulsion polymerization.

3. The process of claim 2 wherein the aqueous latex polymer is prepared from a monomer mixture, the major proportion of which is composed of monomers selected from the ($C_1$-$C_8$) alkyl esters of acrylic, methacrylic, ethacrylic and propacrylic acids, the ($C_1$-$C_8$) alkyl diesters of itaconic, citraconic, isocitraconic, fumaric and maleic acids, styrene, vinyl toluene, dimethyl styrene, trimethyl styrene, ethyl styrene, methylethyl styrene, t-butyl styrene, chloromethyl styrene, monochlorostyrene, dichlorostyrene, cyanostyrene, vinyl acetate, vinyl propionate, vinyl butyrate, vinyl valerate, vinyl versatate, methyl vinyl ketone, ethyl vinyl ketone, acrylonitrile, methacrylonitrile, divinyl benzene, vinyl acrylate, butadiene, isoprene and chloroprene.

4. The process of claim 3 wherein the aqueous latex polymer is prepared from a monomer mixture, the major proportion of which is composed of monomers selected from the ($C_1$-$C_8$) alkyl esters of acrylic, methacrylic, ethacrylic, propacrylic acids, the ($C_1$-$C_8$) alkyl diesters of itaconic acid, styrene and acrylonitrile.

5. The process of claim 4 wherein the active hydrogen functional monomer is acrylic acid.

6. The process of claim 1 wherein the isocyanate is selected from toluene diisocyanate; 4,4'-diphenylmethane diisocyanate; ethylene diisocyanate; trimethylene diisocyanate; hexamethylene diisocyanate; tetraethylene diisocyanate; pentamethylene diisocyanate; propylene-1,2-diisocyanate; p-phenylene diisocyanate; 1,4-diisocyanato cyclohexane; cyclopentene 1,3-diisocyanate; 1-methyl phenylene-2,4-diisocyanate; diphenyl-4,4'-diisocyanate; benzene-1,2,4-triisocyanate; xylene-1,4-diisocyanate; 4,4'-diphenylpropane diisocyanate; 1,2,3,4-tetraisocyanato butane; and polymethylene polyphenyl isocyanate.

7. The process of claim 1 wherein the isocyanate is water-emulsifiable.

8. The process of claim 1 wherein the isocyanate is in the form of an aqueous dispersion.

9. The product of the process of claim 1.

10. The product of the process of claim 3.

* * * * *